United States Patent [19]

Haussman

[11] Patent Number: 4,544,947
[45] Date of Patent: Oct. 1, 1985

[54] ADJUSTMENT-FREE DRIVE CIRCUIT FOR COLOR TELEVISION PICTURE TUBES

[75] Inventor: Wolfgang Haussman, Munich, Fed. Rep. of Germany

[73] Assignee: Siemens Aktiengesellschaft, Berlin and Munich, Fed. Rep. of Germany

[21] Appl. No.: 465,497

[22] Filed: Feb. 10, 1983

[30] Foreign Application Priority Data

Feb. 11, 1982 [DE] Fed. Rep. of Germany ....... 3204744

[51] Int. Cl.⁴ .............................................. H04N 9/20
[52] U.S. Cl. ..................................................... 358/65
[58] Field of Search ........................................... 358/65

[56] References Cited

U.S. PATENT DOCUMENTS 4,053,927 10/1977 Schmidtmann ...................... 358/65

Primary Examiner—Richard Murray
Attorney, Agent, or Firm—Herbert L. Lerner; Laurence A. Greenberg

[57] ABSTRACT

Adjustment-free drive circuit for color television picture tubes, including an amplifier having a non-inverting input receiving an equalized signal of an individual color component red, green or blue as a reference value, an inverting input receiving a voltage proportional to the actual value of the cathode current, and an output, the reference value at the non-inverting input being compared in the amplifier with the actual value at the inverting input for issuing a signal at the output of the amplifier having the smallest possible difference between the desired and actual values, the output of the amplifier being connected to the control grid of a picture tube for applying the signal issued at the output thereto.

3 Claims, 1 Drawing Figure

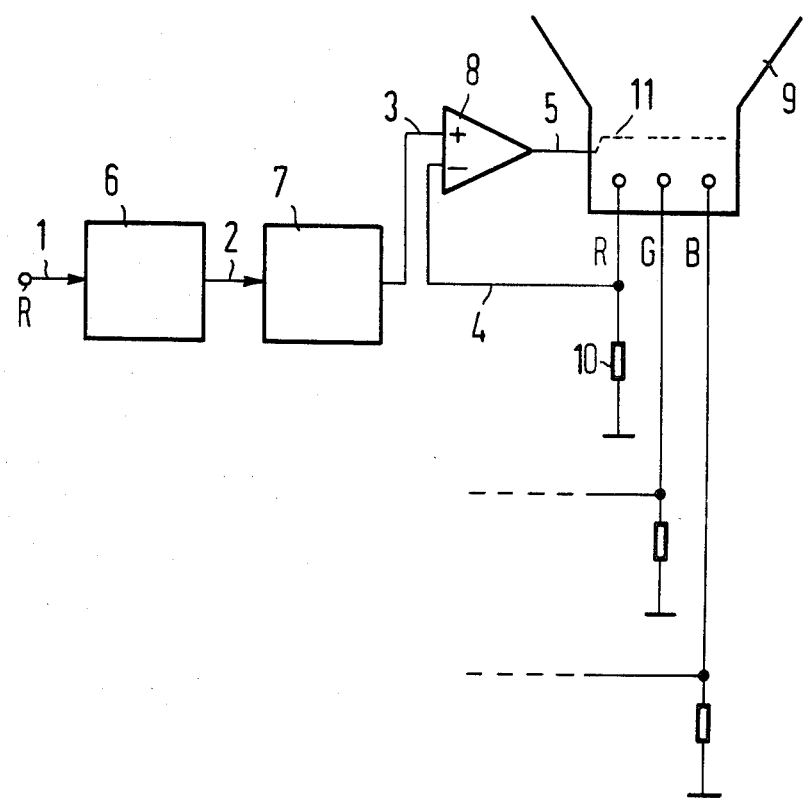

ADJUSTMENT-FREE DRIVE CIRCUIT FOR COLOR TELEVISION PICTURE TUBES

The invention relates to an adjustment-free drive circuit for color television picture tubes.

In a color television transmission system, the picture tube is the last link in the transmission chain. The picture tube performs the conversion of electrical signals into optical signals. This conversion process was heretofore accomplished in a technically unsatisfactory manner, since the transfer characteristic of the picture tube which is in effect in the presently used circuits, has major tolerances.

Among these tolerances are not only manufacturing tolerances but also additional changes which occur during operation, due to temperature rise and aging.

In color television tubes, these tolerances must be compensated in a suitable manner since synchronism is required of the three beam systems required in such a case for the base colors red, green and blue, for maintaining color balance.

In the known circuit techniques for driving color picture tubes, the possibility is provided in at least two of the three color channels, for adjusting the so-called black level or picture black and white level.

Up to now, the adjustment was mainly made manually, for instance, by selecting a point on the picture tube characteristic in the vicinity of the beam current for the black level cutoff. With the vertical deflection disconnected, a horizontal line is obtained on the picture screen, the color of which is adjusted so that a gray that is as neutral as possible is obtained. For adjusting the white level, a point in the range of the maximum beam current is selected. For this purpose, for instance, the color bar test picture can be used, in which the reproduced white area is to be adjusted to a white that is as neutral as possible.

Circuits have already been proposed which perform the black level adjustment automatically. In such a case the cathode currents of the three beam systems are sampled, for instance, within the region of the black porch within the FBAS (composite video) signal, and are adjusted to a fixed value. This circuit has rather good properties but covers only the black level and requires considerable technical means.

It is accordingly an object of the invention to provide an adjustment-free drive circuit for color television picture tubes, which overcomes the hereinaforementioned disadvantages of the heretoforeknown devices of this general type, and which includes the picture tube characteristic in a control loop and thus reduces the picture tube tolerances to an insignificant amount.

With the foregoing and other objects in view there is provided, in accordance with the invention, an adjustment-free drive circuit for color television picture tubes, comprising an amplifier having a non-inverting input receiving an equalized signal of an individual color component red, green or blue as a reference value, an inverting input receiving a voltage proportional to the actual value of the cathode current, and an output, the reference value at the non-inverting input being compared in the amplifier with the actual value at the inverting input for issuing a signal at the output of the amplifier having the smallest possible difference between the desired and actual values, the output of the amplifier being connected to the control grid of a picture tube for applying the signal issued at the output thereto.

In accordance with another feature of the invention, there is provided a linear network connected to the non-inverting input for equalizing the individual color component signals with an artificial picture tube characteristic.

In accordance with a concomitant feature of the invention, there is provided a read-only memory storing an inverse function of a predistortion characteristic on the transmitter side, the read-only memory receiving digitalized signals of the individual color component, and a digital-to-analog converter connected between the read-only memory and the non-inverting input of the amplifier for applying the equalized signal.

Other features which are considered as characteristic for the invention are set forth in the appended claims.

Although the invention is illustrated and described herein as embodied in an adjustment-free drive circuit for color television picture tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a schematic and diagrammatic circuit diagram of an embodiment of the invention.

Referring now in detail to the only FIGURE of the drawing, it is seen that an embodiment is shown in which the signals of the individual color components red, green and blue are furnished by a digital system. The drive circuit according to the invention operates with a current control, contrary to the commonly used voltage controls. This achieves the result that none of the picture tube tolerances have an effect, since the cathode current is determined and impressed by the drive circuit alone. The curvature of the picture tube characteristic is likewise compensated in this case.

It is assumed that the video signal is predistorted on the transmitter side by a characteristic which corresponds mathematically exactly to the inverse function of the picture tube characteristic. Since the overall transmission system should again have linear transfer behavior, an artificial picture tube characteristic must be inserted in the current-control mode of operation of the picture tube. This can be accomplished, for instance, through a suitably constructed linear network or by a read-only memory as is shown in the FIGURE, which is advantageous in the case of a digital system. It is shown in the FIGURE that the digital signal R of the color red controls address inputs of a read-only memory 6 through an input 1. In the read-only memory (ROM) 6, the inverse function of the predistortion characteristic on the transmitter side is contained in a mathematically exact form.

The equalized signal of the color red is therefore present at the output 2 of the read-only memory 6. By means of a digital-to-analog converter 7, the output signal of the memory 6 is converted into an analog signal which represents the desired value for an apmlifier 8 and is fed to a non-inverting input 3 of the amplifier 8. A voltage proportional to the actual value of the cathode current is taken off at a resistor 10. The voltage addresses an inverting input 4 of the amplifier 8. In the amplifier 8, the desired value at the point 3 is compared with the actual value at the point 4 and a signal appears at an output 5 in which the difference between the desired and the actual value is minimized. The output 5 of the amplifier directly controls the control grid 11 of the color television picture tube 9.

In the FIGURE, only the circuit portion for the red channel is shown. In the drive circuit according to the invention, identical circuit parts are provided for the channels green and blue.

The advantages of the drive circuit according to the invention are that neither a black value nor a white value adjustment is required. Changes of the picture tube characteristic due to temperature and aging have no effect. Furthermore, a very accurate compensation of the predistortion on the transmitter side can be accomplished by the equalizing network in the ROM 6.

The above-mentioned advantages result not only in a simplification for manufacture and service due to the elimination of adjustment points, but in a further improvement of the picture quality as well, which is obtained by the fact that in the circuit according to the invention, tolerances in the slope of the beam system among each other are also equalized.

The foregoing is a description corresponding to German Application No. P 32 04 744.4, dated Feb. 11, 1982, the International priority of which is being claimed for the instant application, and which is hereby made part of this application. Any discrepancies between the foregoing specification and the aforementioned corresponding German application are to be resolved in favor of the latter.

I claim:

1. Adjustment-free drive circuit for color television picture tubes, comprising an amplifier having a non-inverting input receiving an equalized signal of an individual color component red, green or blue as a reference value, an inverting input receiving a voltage proportional to the actual value of the cathode current, and an output, said reference value at the non-inverting input being compared in said amplifier with said actual value at said inverting input for issuing a signal at said output of said amplifier having the smallest possible difference between said desired and actual values, said output of said amplifier being connected to the control grid of a picture tube for applying said signal issued at said output thereto.

2. Drive circuit according to claim 1, including a linear network connected to said non-inverting input for equalizing the individual color component signals with an artificial picture tube characteristic.

3. Drive circuit according to claim 1, including a read-only memory storing an inverse function of a predistortion characteristic on the transmitter side, said read-only memory receiving digitalized signals of the individual color component, and a digital-to-analog converter connected between said read-only memory and said non-inverting input of said amplifier for applying said equalized signal.

* * * * *